US009953550B2

(12) United States Patent
Greczanik et al.

(10) Patent No.: US 9,953,550 B2
(45) Date of Patent: Apr. 24, 2018

(54) SCALABLE ILLUMINATED DISPLAY SYSTEM

(71) Applicants: Vince Greczanik, Norton, OH (US); Mike Oister, Massillon, OH (US); Scott Vollmer, Akron, OH (US)

(72) Inventors: Vince Greczanik, Norton, OH (US); Mike Oister, Massillon, OH (US); Scott Vollmer, Akron, OH (US)

(73) Assignee: National Inventors Hall of Fame, Inc., North Canton, OH (US)

( * ) Notice: Subject to any disclaimer, the term of this patent is extended or adjusted under 35 U.S.C. 154(b) by 586 days.

(21) Appl. No.: 14/670,648

(22) Filed: Mar. 27, 2015

(65) Prior Publication Data

US 2015/0331579 A1 Nov. 19, 2015

Related U.S. Application Data

(60) Provisional application No. 61/994,470, filed on May 16, 2014.

(51) Int. Cl.

| | |
|---|---|
| ***G09F 3/04*** | (2006.01) |
| ***G09F 13/04*** | (2006.01) |
| ***G06F 3/044*** | (2006.01) |
| *G09F 7/18* | (2006.01) |
| *G09F 13/22* | (2006.01) |

(52) U.S. Cl.

CPC .............. *G09F 13/04* (2013.01); *G06F 3/044* (2013.01); *G09F 2007/186* (2013.01); *G09F 2013/222* (2013.01)

(58) Field of Classification Search

CPC ................................ F21V 21/008; F21S 4/15

USPC ........................... 40/452, 489, 617, 623, 781

See application file for complete search history.

(56) References Cited

U.S. PATENT DOCUMENTS

| | | | | |
|---|---|---|---|---|
| 4,858,088 A * | 8/1989 | Agabekov | F21V 19/0085 | 362/217.12 |
| 6,299,332 B1 * | 10/2001 | Huang | A47G 33/0836 | 362/235 |
| 6,362,801 B1 * | 3/2002 | Yuhara | G09F 9/33 | 345/82 |
| 7,219,460 B1 * | 5/2007 | Grayson | A47G 1/06 | 40/700 |
| 2005/0105291 A1 * | 5/2005 | Wu | F21V 27/02 | 362/294 |

* cited by examiner

*Primary Examiner* — Joanne Silbermann

(74) *Attorney, Agent, or Firm* — Buckingham, Doolittle & Burroughs, LLC

(57) ABSTRACT

A display system for exhibiting illuminated icons. The display system comprises an exhibition portion and a support structure. The exhibition portion comprises a plurality of icons oriented in vertical columns in a generally tessellating pattern. Each icon comprises a front component attached to a back component with a pair of channels sandwiched between the front and back components. The front component comprises an insert plate comprising an identification element that is illuminated by a light emitting element housed within the back component. The support structure connects the plurality of icons via the pairs of channels and provides power to the light emitting element.

10 Claims, 10 Drawing Sheets

SCALABLE ILLUMINATED DISPLAY SYSTEM

CROSS-REFERENCE

This application claims priority from Provisional Patent Application Ser. No. 61/994,470 filed May 16, 2014.

FIELD OF THE INVENTION

This invention pertains generally to a display system for exhibiting icons, and more particularly to a scalable display system comprising a plurality of individual illuminated personalized icon awards suspendable from a ceiling.

BACKGROUND

Awards or other recognitions of achievement are commonly displayed in areas accessible to the viewing public. Icons, plaques or other similar engraved tributes are often used in these displays. Typically, a plaque is first engraved and then attached to a wall or placed in a display case for viewing. As award displays are commonly illuminated, lighting may be externally directed onto the plaque surface to illuminate the display. Other attempts to exhibit icons include placing them in large space consuming display cases. Alternatively, the display may comprise a large board or other surface mounted to a wall, and individual etched name plates are attached to the board or surface as desired.

Consequently, there exists a need for a system for displaying an icon, a plaque or other decorative recognition of achievement. The present invention discloses an illuminated display system that does not require wall space for the exhibition. The illuminated display system is scalable to accommodate a varying amount of icons. The illuminated display system is also able to provide illumination in a variety of colors. Additionally, as the illuminated display system is suspendable from a ceiling by its own power source or support structure, a wall surface is not required to display the icons.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a scalable illuminated display system for exhibiting icons. The display system comprises an exhibition portion and a support structure. The support structure comprises a connecting component comprising a plurality of conductors. The exhibition portion comprises a plurality of icons oriented vertically along the support structure. Each of the plurality of icons comprises a front component securable to a back component that once attached appear to be a single integrated unit. The plurality of icons further comprises a pair of channels, running substantially vertically through each icon, that are positioned in between the front component and the back component and that substantially encapsulate one of the plurality of conductors within each channel. Each front component comprises an insert plate with a magnet. Each back component comprises a light emitting element in electrical communication with the plurality of conductors. When the insert plate is attached to the front component, a switch is completed allowing the light emitting element to illuminate.

Furthermore, in a preferred embodiment of the invention the plurality of icons are oriented in a plurality of vertical columns in a generally tessellating pattern. Each of the plurality of icons is hexagonal in shape and is substantially translucent so that illumination from the light emitting element is transmitted throughout the entire display system. Additionally, each of the plurality of vertical columns is oriented so as to share at least one of the plurality of cables with an adjacent column.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
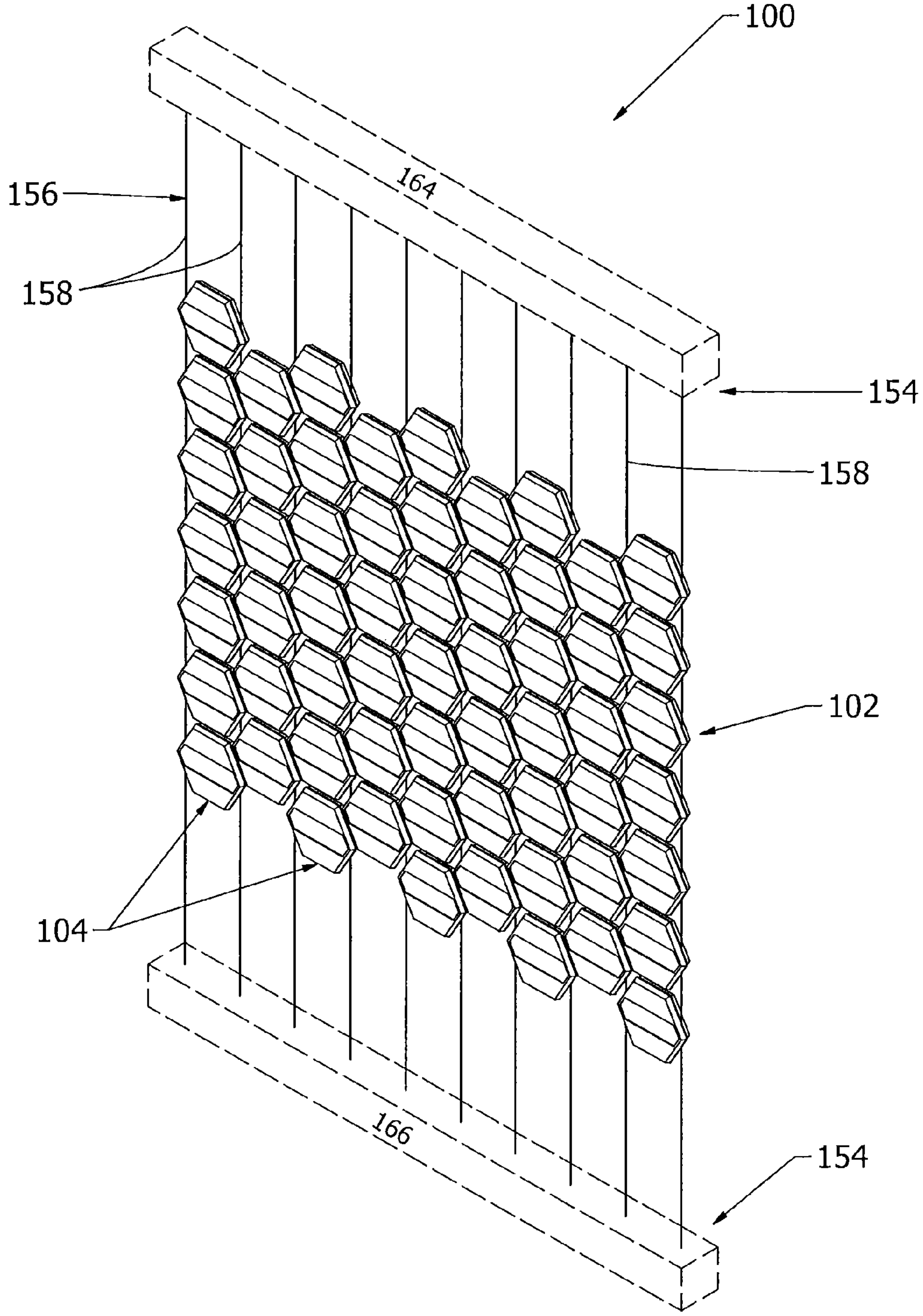
FIG. 1 illustrates a perspective view of a scalable illuminated display system in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to a display system for plaques or other award icons that is illuminated and scalable.

Figure 9:
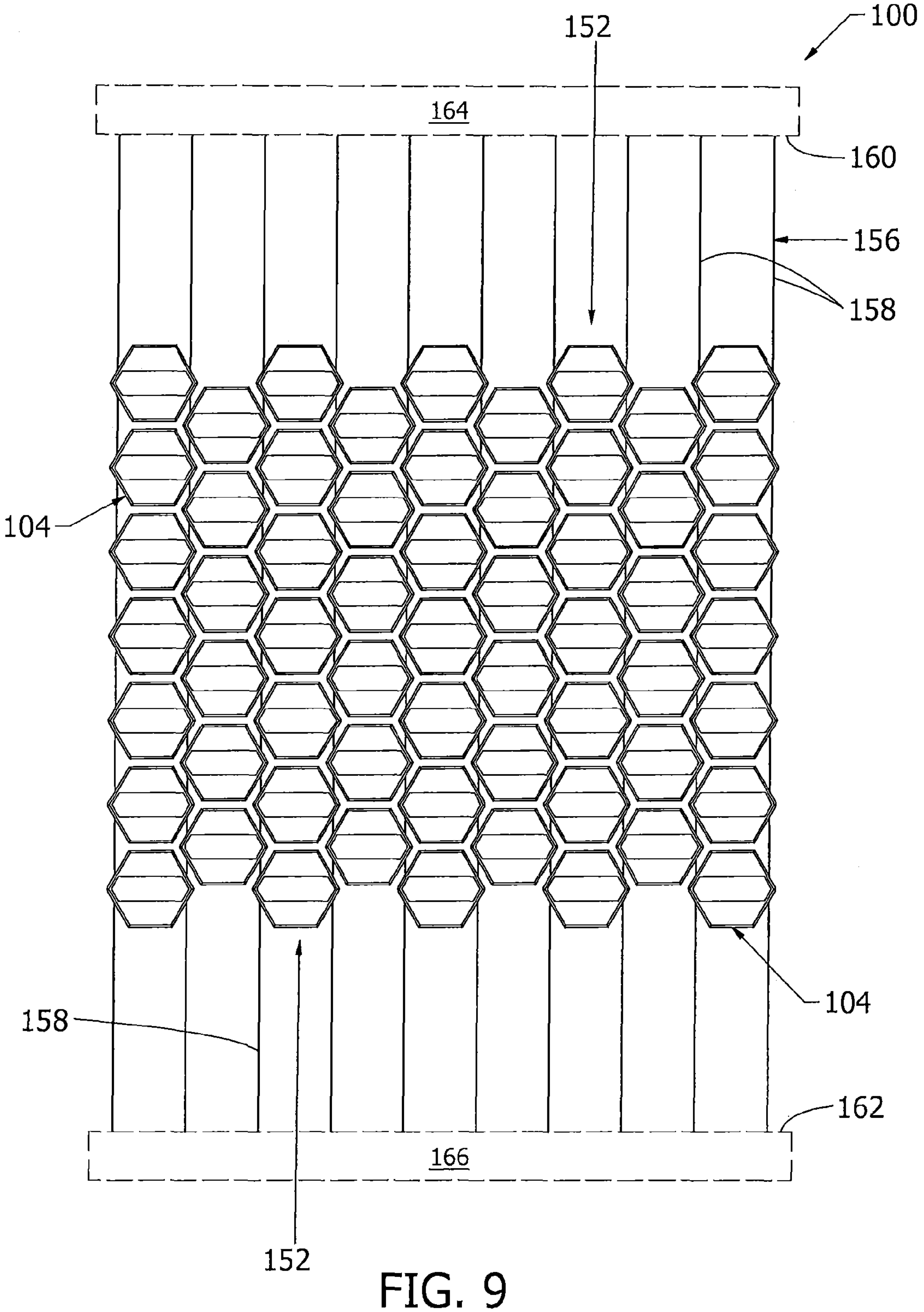
FIG. 9 illustrates a front view of the scalable illuminated display system in accordance with the disclosed architecture.

Referring initially to the drawings, FIG. 1 illustrates a display system 100. The display system 100 may be used to identify and recognize inventors that have been awarded patents, or any other type of accomplishment, achievement, and the like, or for any kind of information or entertainment dissemination. The display system 100 comprises an exhibition portion 102 and a support structure 154. The exhibition portion 102 comprises a plurality of icons 104 typically oriented in a plurality of vertical columns 152 as illustrated in FIG. 9. The display system 100 may be suspended from a ceiling alleviating the need to use up valuable wall space. Additionally, the display system 100 is scalable with the capacity to add or subtract from the number of the plurality of icons 104 as desired. The plurality of icons 104 may be aligned in a tessellating pattern of interlocking plaques or in any other alignment as desired. When oriented in the tessellating pattern, the plurality of icons 104 are typically connected to each other with a fixed grout design. However, the plurality of icons 104 may also be connected by adhesives, mechanical fasteners, stand-off wall mounts, or any other method known to one of skill in the art.

In a preferred embodiment, each of the plurality of icons 104 is typically shaped as an equilateral hexagonal icon, however this is not meant as a limitation as any geometric or irregular shape may be used. Each the plurality of icons 104 may comprise a plaque, award, or other display form typically constructed of acrylic, plastic, polycarbonate, glass, or any other substantially translucent or transparent material. An acrylic material is desirable as it is fully translucent, non-conductive, machinable, and mechanically stable. However, this is not meant as a limitation as the plurality of icons 104 may also be constructed generally of any solid non-translucent material, such as but not limited to metal, wood, non-translucent plastic, and the like. In a non-translucent embodiment such as metal, a portion of an interior of each icon may use a non-conductive insert to isolate parts of the icon. Additionally, each of the plurality of icons 104 is constructed as a two piece design that appears as a solid unified piece once assembled.

Figure 2:
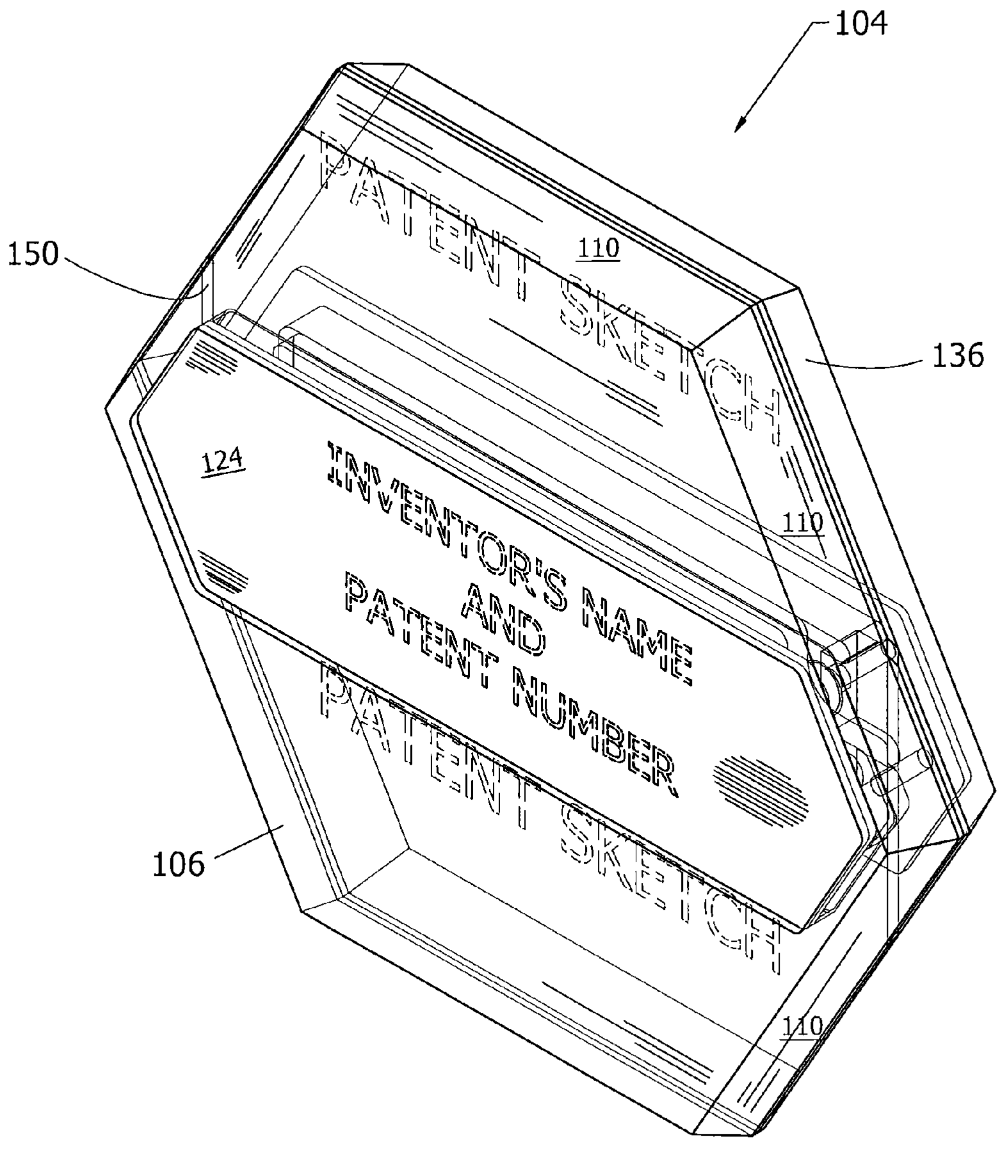
FIG. 2 illustrates a perspective view of one of a plurality of icons of the scalable illuminated display system in accordance with the disclosed architecture.
Figure 3:
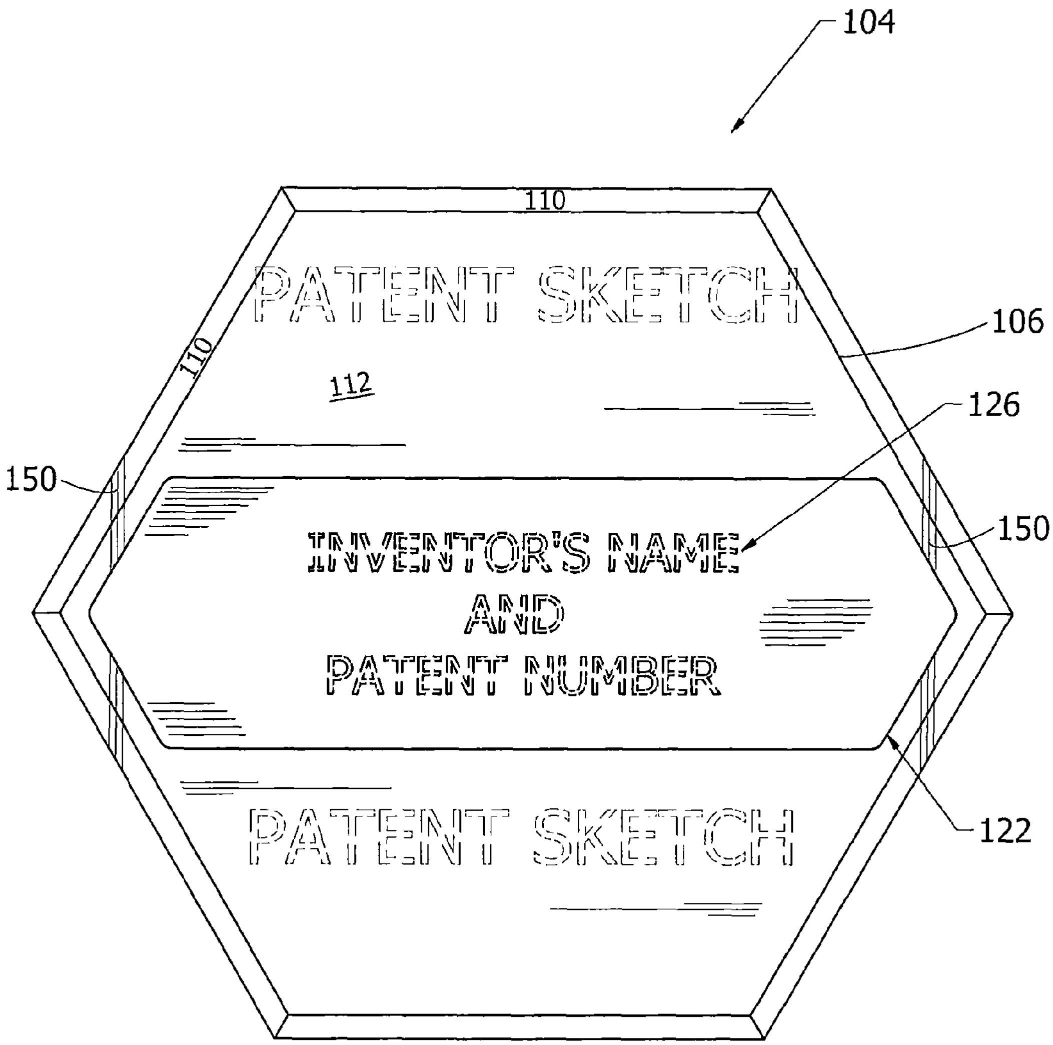
FIG. 3 illustrates a front view of one of the plurality of icons in accordance with the disclosed architecture.
Figure 4:
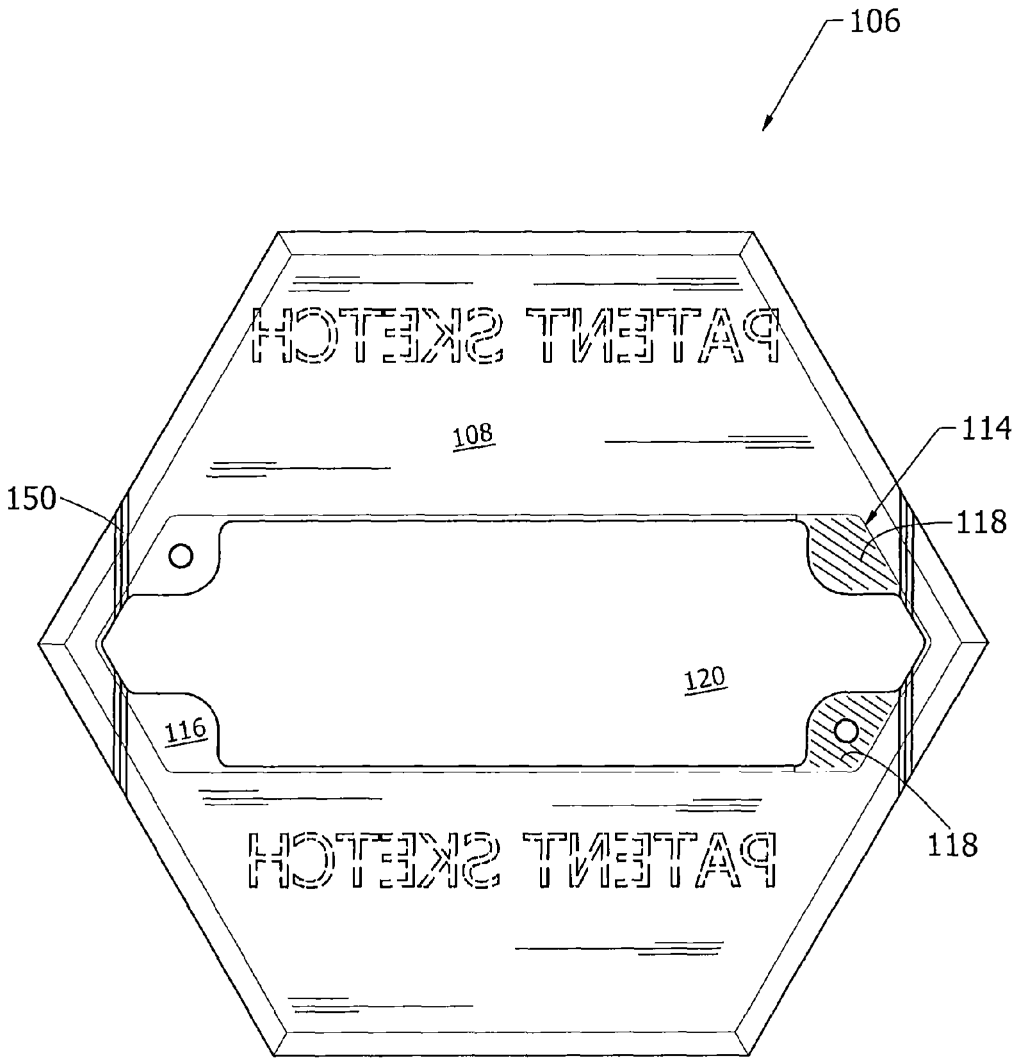
FIG. 4 illustrates a sectional view of a front component of one of the plurality of icons facing the front in accordance with the disclosed architecture.
Figure 5:
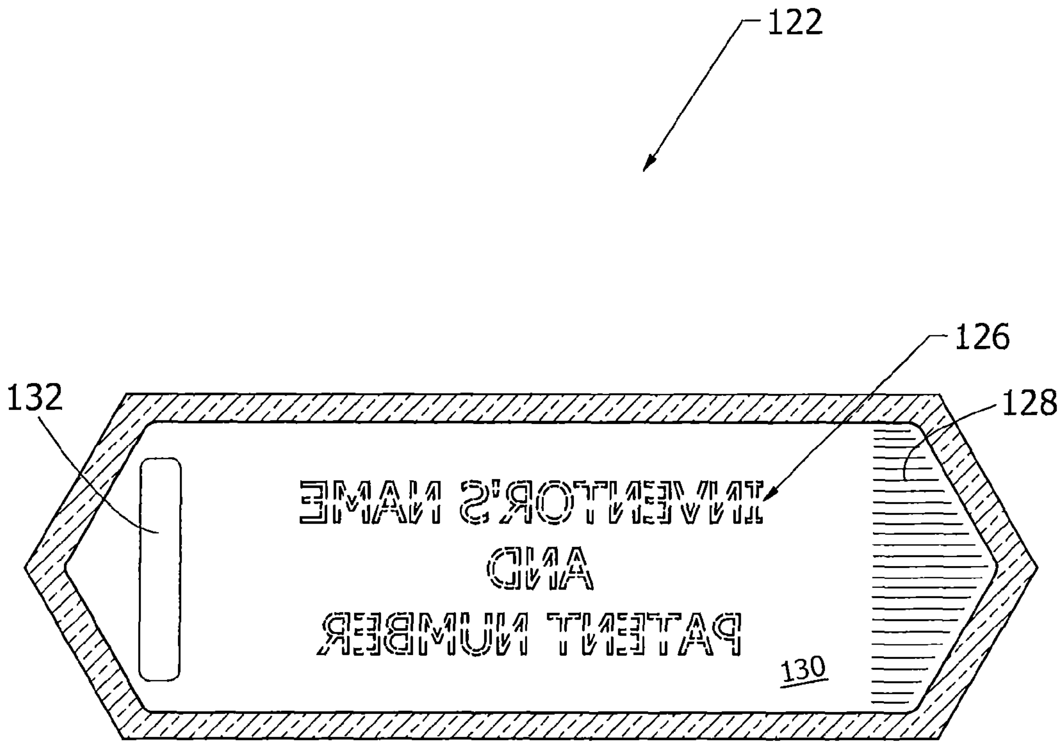
FIG. 5 illustrates a sectional view of an insert plate of the front component in accordance with the disclosed architecture.

As illustrated in FIGS. 2-4, each of the plurality of icons 104 comprise a front component 106, a back component 136, and a pair of channels 150. Once the front component 106 is attached or otherwise secured to the back component 136, the pair of channels 150 are formed in between the front component 106 and the back component 136. Both the front component 106 and the back component 136 are grooved to create approximately half of each channel. As the front component 106 is secured to the back component 136, the grooves align to form the pair of channels 150 oriented approximately vertically through each icon 104. The front component 106 is typically attached to the back component 136 via a plurality of ferrous screws or the like as discussed infra.

The front component 106 comprises an interior surface 108, an exterior surface 112, and a plurality of edges 110. In a preferred embodiment, the plurality of edges 110 are beveled edges that slope forward terminating in an essentially flat front that is the exterior surface 112. The front component 106 further comprises an insert cavity 114 and an insert plate 122. The insert cavity 114 is cut or milled into the exterior surface 112 penetrating inward toward the interior surface 108 creating a space for the insert plate 122. The insert cavity 114 comprises a back 116, an insert notch 118, and a through hole 120. The back 116 typically is cut or milled approximately between 0.15 and 0.40 inches deep into the exterior surface 112 of the front component 106 creating a shelf for the insert plate 122 to rest against. The insert notch 118 is cut or milled deeper into the exterior surface 112 than the back 116. This allows for easy removal of the insert plate 122 as described infra.

As illustrated in FIGS. 2-5, the insert plate 122 comprises an outward facing side 124 and an inward facing side 130. The outward facing side 124 comprises an identification element 126. The identification element 126 may be integrated into the outward facing side 124 by etching, or it may be a second surface etched or otherwise marked with identifying information and then attached to the outward facing side 124. The etching may take place on a thin metalized surface on the back of a piece of clear acrylic to protect the etching. For example, a name and a patent number may be etched onto the insert plate 122. Additionally, etching may be laser or chemically etched into the interior surface 108 of the front component 106 so that the etching appears molded inside the icon 104 once the front component 106 is attached to the back component 136.

The insert plate 122 is preferably at least partially constructed of a translucent material as described supra. To install the insert plate 122, a user simply places or implants it within the borders of the insert cavity 114 like a piece in a jig saw puzzle with the inward facing side 130 placed into the insert cavity 114. The insert plate 122 further comprises a portion adjacent to the insert notch 128 located generally next to the insert notch 118 when the insert plate 122 is in place within the insert cavity 114. To remove the insert plate 122 from the insert cavity 114, the user may depress the insert plate 122 with a thumb or finger placed on the portion adjacent to the insert notch 128. As the portion adjacent to the insert notch 128 is pushed inward into the insert notch 118, an edge of the insert plate 122 opposite to the portion adjacent to the insert notch 128 pops out of the insert cavity 114 without the need for a tool.

The insert plate 122 further comprises a magnetic element 132 attached to the inward facing side 130 for holding the insert plate 122 in place within the insert cavity 114 of the front component 106, and for completing a circuit to illuminate the display system as described infra. The magnetic element 132 is typically a neodymium magnet attached to the inward facing side 130 of the insert plate 122, however any other type of magnet as is known in the art may be used as well. The magnetic element 132 is located so as to attract at least one of the ferrous screws that attach the front component 106 to the back component 136, thereby holding the insert plate 122 in place within the insert cavity 114. The magnetic element 132 also actuates a reed relay to complete the electrical circuit powering the illumination. The insert plate 122 may further comprise a diffuser (not shown) adherable to the inward facing side 130 of the insert plate 122. The diffuser receives and diffuses a light source essentially evenly into the inward facing side 130 of the insert plate 122. This is desirable as it prevents the formation of a "hotspot" which would occur behind the identification element 126, and it allows the insert plate 122 to be evenly illuminated along the entire length. The diffuser and the magnetic 132 may be secured to the insert plate 122 via mechanical fastener, adhesive, or the like.

Figure 6:
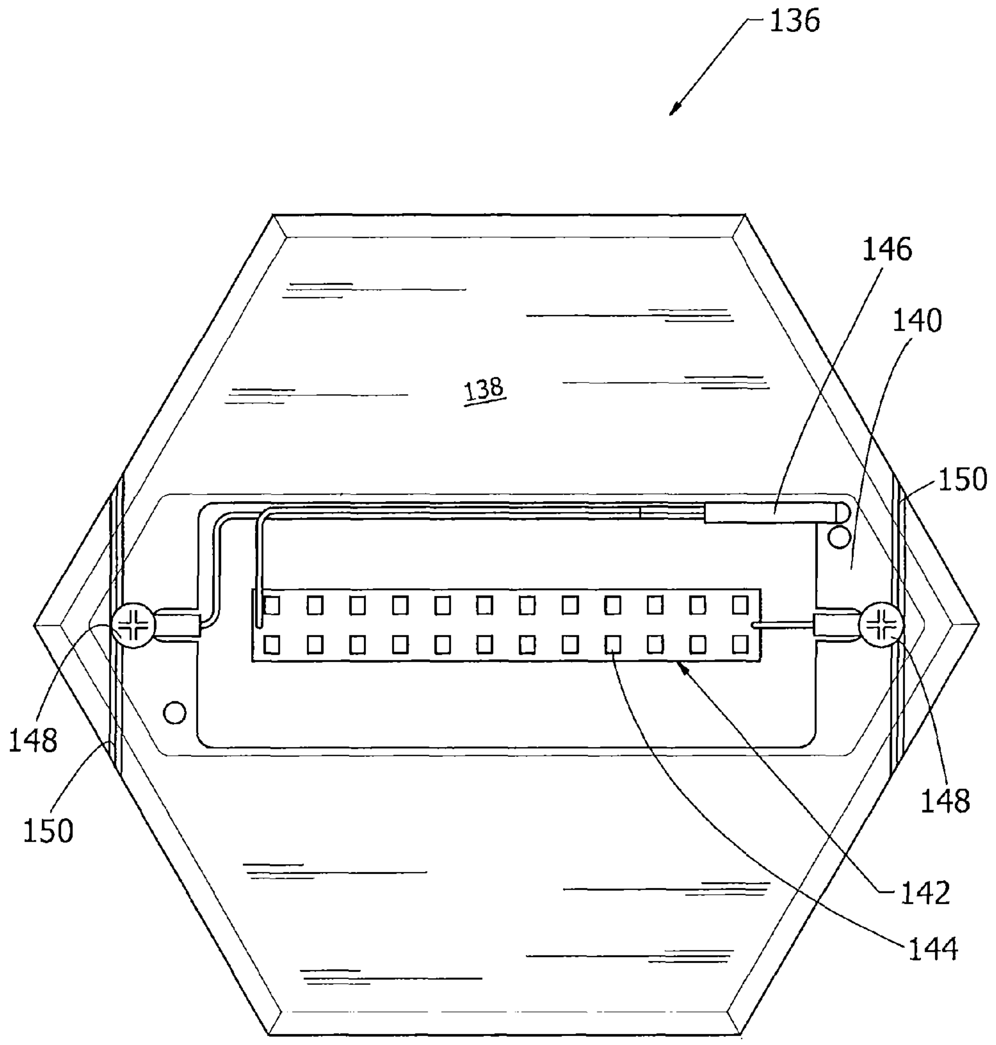
FIG. 6 illustrates a sectional view of a back component of one of the plurality of icons looking towards the rear in accordance with the disclosed architecture.
Figure 7:
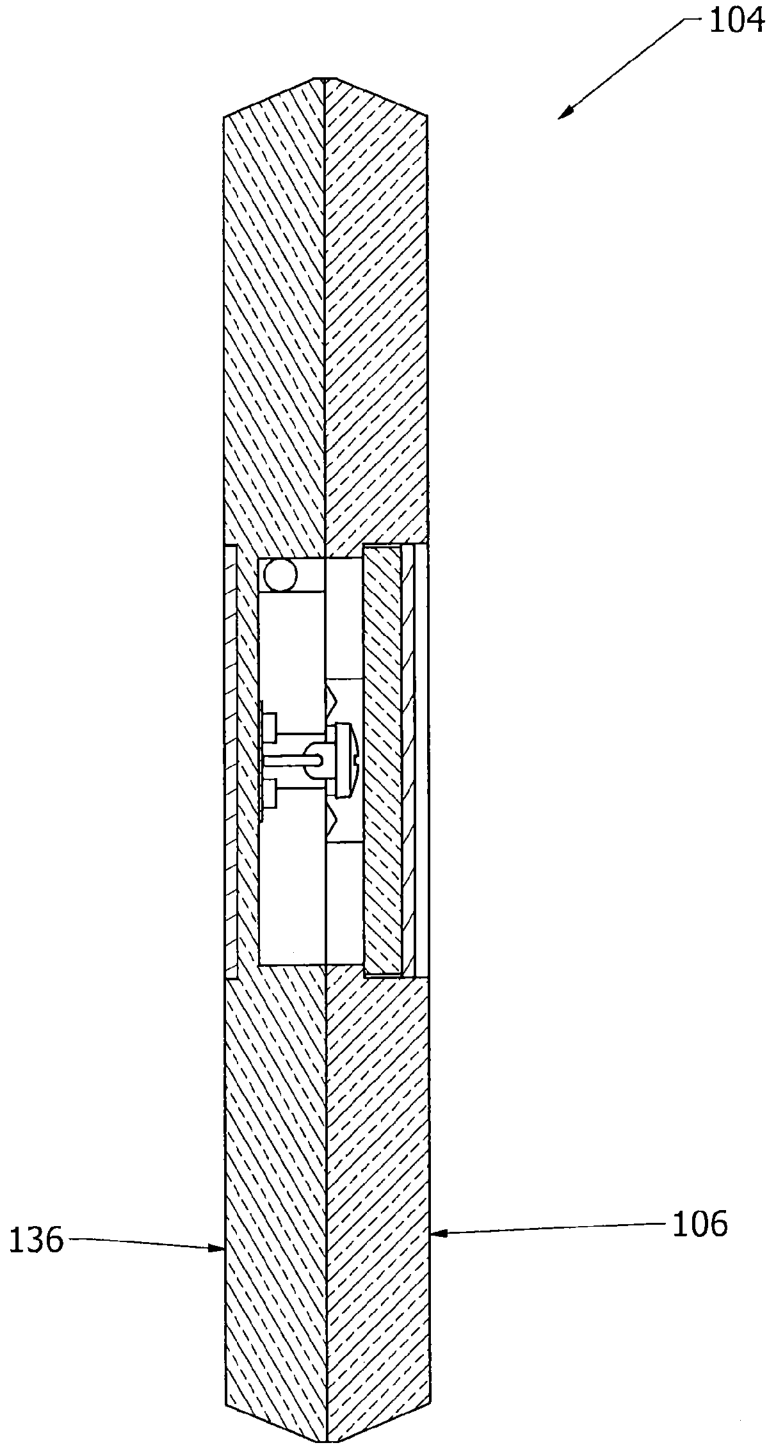
FIG. 7 illustrates a sectional view of one of the plurality of icons in accordance with the disclosed architecture.
Figure 8:
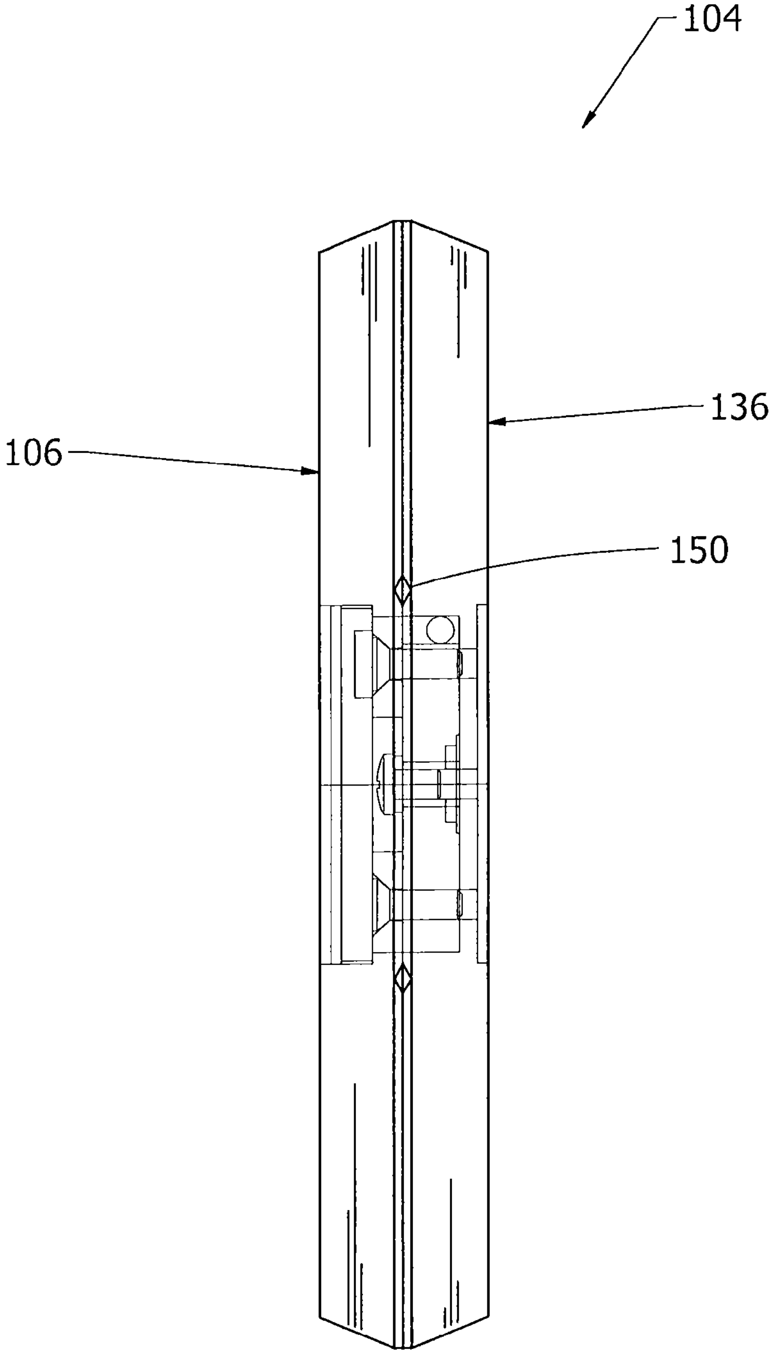
FIG. 8 illustrates a side elevational view of one of the plurality of icons in accordance with the disclosed architecture.

As illustrated in FIGS. 6-8, the back component 136 comprises a front component facing side 138, a light emitting element 142 and a pair of conductor connectors 148. The pair of conductor connectors 148 connect the light emitting element 142 to a power source as described infra. The back 136 may be attached to the front component 106 with screws, bolts, or any other type of ferrous material mechanical fastener for attracting the magnetic element 132, thereby holding the insert plate 122 in place as well. The back component 136 is positioned so that the front component facing side 138 abuts the interior surface 108 of the front component 106. The front component facing side 138 comprises a cavity 140 for receiving and housing the light emitting element 142 within the back component 136.

The light emitting element 142 comprises at least one light emitting diode (LED) 144 and a switch 146. The LED 144 is typically a multi-color LED, preferably an addressable red green blue type LED, and is internally lit within the icon 104 once powered. However, a single color white LED may be used as well in conjunction with a plurality of colored gels (not shown) insertable between the LED 144 and the insert plate 122. Once the insert plate 122 is installed, the switch 146 completes a circuit powering or activating the LED 144. The switch 146 is typically a reed switch created with the magnetic element 132. Each LED 144 is installed in a correct polarity to light and may be capable of receiving a control signal via the direct current power source, a radio frequency source such as blue tooth, Wi-Fi, or other wireless technology, or by any other method of sending a signal known to one of skill in the art to respond in series with or independently of the other LED's. Depending on the opacity and/or the density of etching of the front component 106 and the back component 136, the display system 100 may become a projection display surface in which each icon 104 essentially becomes an addressable pixel in the tessellated display surface.

Figure 10:
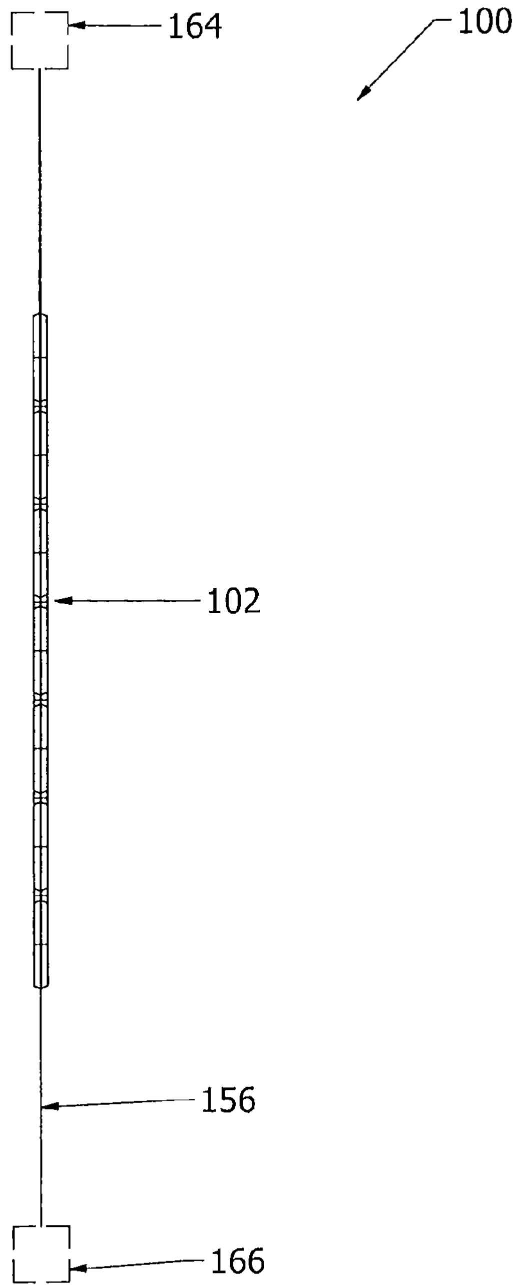
FIG. 10 illustrates a side view of the scalable illuminated display system in accordance with the disclosed architecture.

As illustrated in FIGS. 1, 9 and 10, the support structure 154 comprises a connecting component 156 and a suspension component 164. The connecting component 154 is suspended from the suspension component 164 and connects the plurality of icons 104 in the vertical orientation via the pair of channels 150. The suspension component 164 is typically an insulated track manufactured from a non-conductive material that is attachable to a ceiling or a wall surface and is connected to a power source. In a preferred embodiment, the suspension component 164 may comprise an acrylic section slid into a trade strut material which would attach to the ceiling.

The connecting component 156 comprises a plurality of conductors 158 each comprising a first end 160 and a second end 162. In a preferred embodiment, the second ends 162 of the plurality of conductors 158 are in electrical communication with the power source. However, an embodiment where the first ends 160 of the plurality of conductors 158 are electrically connected to the power source via the suspension component 164, and then run through the pair of channels 150 of the icons 104 is contemplated by the inventor as well. The plurality of conductors 158 are typically low voltage direct current conductors, for example aircraft cables, conductive rods, and the like. The suspension component 164 attaches to the first end 160 of each of the plurality of conductors 158. Therefore the plurality of conductors 158 extend downward from the suspension component 164. A plurality of ball end cables (not shown) may be threaded through a plurality of machined holes (not shown) to create a combination suspension/conductor cable system from the plurality of conductors 158 and the suspension component 164.

In a preferred embodiment, the plurality of conductors 158 are approximately six inches apart, although the distance may vary depending on the dimensions of the icons 104. The plurality of conductors 158 are used to suspend the plurality of icons 104, usually from the ceiling surface, and to provide direct current power to the LED's 144. The support structure 154 further comprises a tensioning component 166. The tensioning component 166 may comprise a cable grip, a threaded tensioner, and insulated bushing and a metal C-channel anchor attached to a floor, or any other similar insulating structure known to one of skill in the art. The second ends 162 of the plurality of conductors 158 are attached to the tensioning component 166. Therefore, each of the plurality of conductors 158 is secured between the connecting suspension component 164 at the first end 160 and the tensioning component 166 at the second end 162. Each conductor 158 may be adjustably tensioned using a cable grip through an insulation bushing to pre-stress the conductors 158 prior to installing the plurality of icons 104, or by any comparable method of attachment as is known in the art. The tensioning component 166 may comprise a base. The base may house the power source, conductors, circuit protectors, fuses, and the like, and may act as a stage for the enshrinement of a new icon awardee. The base may further comprise a glass barrier to protect a person from incidental contact with the display system 100.

As the plurality of conductors 158 run through the pair of channels 150, the plurality of conductors 158 are in electrical communication with the light emitting elements 142, thereby electrifying the LED's 144 once the circuit is complete. The plurality of conductors 158 are typically alternatively polarized cables and may further comprise a plurality of fuses (not shown). The display system 100 is oriented so that each of the plurality of vertical columns 152 shares one of the plurality of conductors 158 with an adjacent column creating an interlocking display grid. This allows each conductor 158 to polarize both of the vertical columns 152 in which it runs. As such, the next conductor 158 would be alternatively polarized. The plurality of conductors 158 are electrically connected to the LED's 144 via the pair of conductor connectors 148, typically screws, metal clips, cable grips, or the like. The conductor connectors 148 also function to suspend the icons 104 on the connecting component 156 of the support structure 154. Essentially, once the front component 106 is attached to the back component 136, the plurality of conductors 158 are sandwiched within the pair of channels 150 thus clamping each icon 104 in an orientation approximately parallel with the conductors 158.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A display system comprising:

an exhibition portion comprising a plurality of icons, each of the plurality of icons comprising:

a front component comprising an exterior surface, an insert cavity penetrating the exterior surface, and an insert plate implantable within the insert cavity, wherein the insert plate comprises a magnetic element for attaching the insert plate to the front component; and a back component comprising a light emitting element and a front facing side comprising a cavity, wherein the light emitting element is comprised of at least one light emitting diode and a switch and is housed within the cavity, and further wherein the back component is secured to the front component, and a pair of channels positioned in between the front component and the back component; and a support structure comprising a suspension component and a connecting component in electrical communication with the light emitting element for connecting the plurality of icons via the pair of channels, and wherein the connecting component is attached to the suspension element, and further wherein the back component further comprises a pair of conductor connectors for connecting the light emitting element to the connecting component of the support structure.

2. The display system of claim 1, wherein the at least one light emitting diode is a multi-color diode and is capable of receiving a control signal.

3. The display system of claim 1, wherein the switch is a reed switch.

4. A display system comprising:

an exhibition portion comprising a plurality of icons oriented in a plurality of vertical columns, each of the plurality of icons comprising:

a front component comprising an exterior surface, an insert cavity penetrating the exterior surface, and an insert plate implantable within the insert cavity; and a back component comprising a light emitting element, wherein the back component is secured to the front component, and a pair of channels positioned in between the front component and the back component; and a support structure comprising:

a suspension component;

a tensioning component; and a connecting component in electrical communication with the light emitting element for connecting the plurality of icons via the pair of channels, wherein the connecting component comprises a plurality of conductors secured between the suspension component and the tensioning component.

5. The display system of claim 4, wherein the plurality of conductors are sandwiched between the front component and the back component within the pair of channels.

6. The display system of claim 5, wherein the plurality of conductors are alternatively polarized direct current cables.

7. The display system of claim 6, wherein each of the plurality of conductors comprise a first end attachable to the suspension component and a second end adjustably attachable to the tensioning component.

8. The display system of claim 4, wherein the tensioning component comprises a metal C-channel.

9. The display system of claim 4, wherein the plurality of icons are hexagonally configured and are further oriented in a tessellating pattern.

10. The display system of claim 4, wherein the suspension component is an insulated track.

* * * * *